(12) United States Patent
Schneider

(10) Patent No.: US 9,746,301 B2
(45) Date of Patent: Aug. 29, 2017

(54) COMBINATION TAPE MEASURE AND MARKER

(71) Applicant: Omer Schneider, Norman, OK (US)

(72) Inventor: Omer Schneider, Norman, OK (US)

( * ) Notice: Subject to any disclaimer, the term of this patent is extended or adjusted under 35 U.S.C. 154(b) by 122 days.

(21) Appl. No.: 14/731,653

(22) Filed: Jun. 5, 2015

(65) Prior Publication Data

US 2015/0354934 A1 Dec. 10, 2015

Related U.S. Application Data

(60) Provisional application No. 61/010,084, filed on Jun. 10, 2014.

(51) Int. Cl.
*G01B 3/10* (2006.01)

(52) U.S. Cl.
CPC .... *G01B 3/1084* (2013.01); *G01B 2003/1089* (2013.01)

(58) Field of Classification Search
CPC ............... G01B 3/1084; G01B 2003/1089
USPC .......................................................... 33/668
See application file for complete search history.

(56) References Cited

U.S. PATENT DOCUMENTS

| | | | | |
|---|---|---|---|---|
| 2,882,601 A * | 4/1959 | Humel | ................. | G01B 3/1084 33/26 |
| 2,906,024 A * | 9/1959 | Smith | ................. | G01B 3/1084 33/27.03 |
| 3,148,455 A * | 9/1964 | Aciego | ................... | B25H 7/04 33/668 |
| 3,336,678 A * | 8/1967 | Chamberlain | ....... | G01B 3/1084 33/42 |
| 3,731,389 A * | 5/1973 | King | ..................... | B43K 29/08 33/27.03 |
| 3,802,083 A * | 4/1974 | Freed | ...................... | B25H 7/04 33/668 |
| 4,015,337 A | 4/1977 | Taylor | | |
| 4,439,927 A * | 4/1984 | Elliott | ................. | G01B 3/1005 33/668 |
| 4,542,589 A * | 9/1985 | Yamamoto | .......... | G01B 3/1084 33/18.1 |
| 4,630,376 A * | 12/1986 | Pentecost | ............ | G01B 3/1084 33/668 |
| 4,766,673 A | 8/1988 | Bolson | | |
| 4,965,941 A | 10/1990 | Agostinacci | | |
| 5,416,978 A * | 5/1995 | Kaufman | ................ | B25H 7/04 33/39.1 |
| 5,435,074 A | 7/1995 | Holevas | | |

(Continued)

*Primary Examiner* — Christopher Fulton
(74) *Attorney, Agent, or Firm* — Global Intellectual Property Agency, LLC; Daniel Boudwin

(57) ABSTRACT

A combination tape measure and marker is provided. The combination tape measure and marker includes a measuring tape housing having a top portion and a front portion. A lever arm is connected to the top portion of the measuring tape housing. A cartridge is integrally attached to the front portion of the measuring tape housing. The lever arm extends through the cartridge. A marker is removably secured within the cartridge and is operationally attached to the lever arm. A spring is housed in the cartridge and provides a retracted and extended position for the marker. The marker is movable separately and independently from the measuring tape housing by selectively depressing the lever arm to lock the marker in an extended position to mark a surface.

12 Claims, 2 Drawing Sheets

(56) References Cited

U.S. PATENT DOCUMENTS

| | | | |
|---|---|---|---|
| 6,434,854 B1 | 8/2002 | MacColl | |
| 6,880,260 B2 * | 4/2005 | Baida | B25C 3/008 |
| | | | 33/668 |
| 7,269,913 B2 * | 9/2007 | Holevas | G01B 3/1084 |
| | | | 33/668 |
| 8,464,436 B2 | 6/2013 | Smith | |
| 2011/0239479 A1 * | 10/2011 | Chisholm | G01B 3/1041 |
| | | | 33/770 |

* cited by examiner

COMBINATION TAPE MEASURE AND MARKER

CROSS REFERENCE TO RELATED APPLICATION

This application claims the benefit of U.S. Provisional Application No. 62/010,084 filed on Jun. 10, 2014. The above identified patent application is herein incorporated by reference in its entirety to provide continuity of disclosure.

FIELD OF THE INVENTION

The invention generally relates to measuring devices. More particularly, the present invention relates to a tape measure having a marking device integrally attached to the measuring tape housing for providing precise marking of a measurement, wherein the marker is extendable via a lever arm and spring system.

BACKGROUND OF THE INVENTION

Various types of tape measures are available for the purpose of measuring a surface. Typically, a user tends to measure a given surface with the help of a tape measure and mark the surface as per the measurement with the help of a tool such as a pencil, pen, marker or the like. The user may utilize both hands in order to hold the tape measure for taking a correct measurement of the surface. However, the user may not be able to mark the surface with exact precision while his/her hands are engaged in holding the tape measure. Accordingly, the user may require assistance from another person for marking the surface as measured by the tape measure. Further, incorrect measurements may be taken when an attempt is made by a single individual to measure the surface and simultaneously mark the surface.

Devices have been disclosed in the prior art that relate to measuring and marking devices. These include devices that have been patented and published in patent application publications. U.S. Pat. No. 3,526,964 to Clark, discloses a flexible measuring tape comprising a blade or tape coiled in a case for storage and which may be withdrawn selective distances for use. The flexible measuring tape has an adaptor on the housing, holding a scribe and an indicator at coincident points relative to the calibration of the tape. Attached to the body of the tape measure, the marker is situated below the opening for the flexible tape measure.

U.S. Pat. No. 3,713,603 to Shore, discloses a measuring tape with a wind up spring equipped with an arresting device that can be used to prevent automatic wind up. No moving parts are involved and the user can readily adjust the extended length of tape without releasing the arresting device.

These prior art devices have several known drawbacks. Each of these devices are directed to measuring devices with an external marking device. The current invention goes beyond the prior art to provide a combination tape measure and marker including a marker removably secured within a cartridge that is integrally attached to the tape measure housing, wherein the marker is operationally attached to the lever arm.

In light of the devices disclosed in the prior art, it is submitted that the present invention substantially diverges in design elements from the prior art and consequently it is clear that there is a need in the art for an improvement to measuring devices. In this regard the instant invention substantially fulfills these needs.

SUMMARY OF THE INVENTION

In view of the foregoing disadvantages inherent in the known types of measuring devices now present in the prior art, the present invention provides an improved combination tape measure and marking device wherein the same can be utilized for providing convenience for the user when marking a specific length corresponding to the measuring tape.

It is therefore an object of the present invention to provide a new and improved combination measuring tape and marking device that has all of the advantages of the prior art and none of the disadvantages.

It is another object of the present invention to provide a combination tape measure and marker including a measuring tape housing having a top portion and a front portion, wherein a lever arm is connected to the top portion of the measuring tape housing that is adapted to deploy a marking apparatus.

It is yet another object of the present invention to provide a combination tape measure and marker including a cartridge integrally attached to the front portion of the measuring tape housing. The lever arm extends through the cartridge.

Another object of the present invention is to provide a combination tape measure and marker including a marker removably secured within the cartridge that is operationally attached to the lever arm. A spring is housed in the cartridge and provides a retracted and extended position for the marker. The marker is movable separately and independently from the measuring tape housing by selectively depressing the lever arm to lock the marker in an extended position to mark a surface.

Yet another aspect of the present invention is to provide a combination tape measure and marker wherein the marker is a felt tip pen, pencil, metal tip pen, or other marking apparatus. The marker tip aligns with a measurement line at the front portion of the tape measure housing when in the extended position.

It is another aspect of the present invention to provide a combination tape measure and marker wherein the cartridge comprises a removable ink cartridge.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
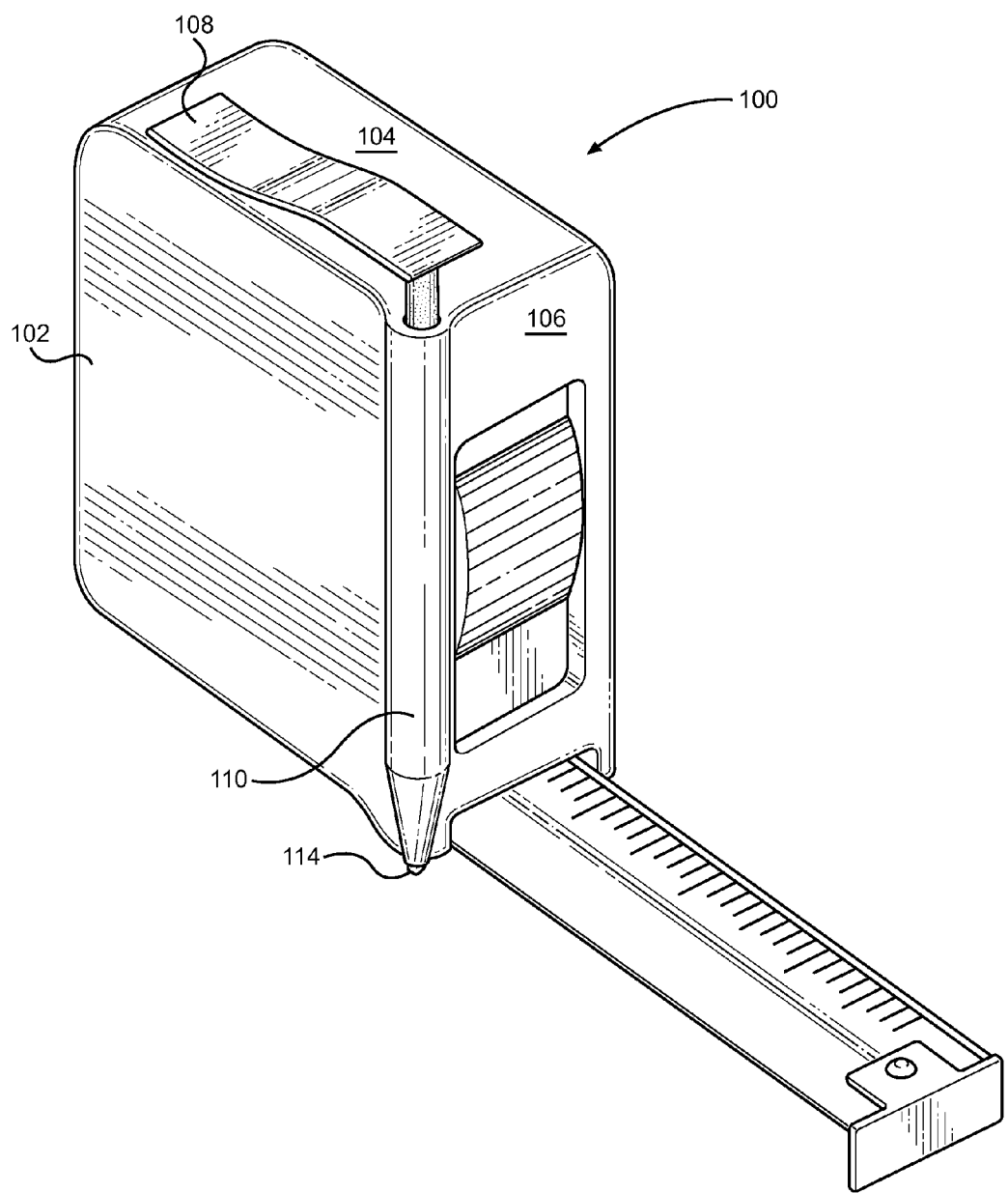
FIG. 1 shows a perspective view of the combination tape measure and marking device according to one embodiment of the present invention.

Reference is made herein to the attached drawings. Like reference numerals are used throughout the drawings to depict like or similar elements of the combination tape measure and marking device. For the purposes of presenting a brief and clear description of the present invention, the preferred embodiment will be discussed as used for measuring and marking lengths. The figures are intended for representative purposes only and should not be considered to be limiting in any respect.

Referring now to FIG. 1, there is shown a perspective view of the combination tape measure and marking device according to one embodiment of the present invention. The combination tape measure and marking device 100 includes a measuring tape housing 102 having a top portion 104 and a front portion 106. The measuring tape housing 102 may include a conventional locking slide to lock the measuring tape at an extended length. Additionally, the measuring tape housing 102 contains a recoiled measuring tape within the body of the housing 102.

A cartridge 110 is integrally attached to the front portion 106 of the measuring tape housing 102. The cartridge 110 comprises a hollow interior configured to receive a complementary ink cartridge or marker. The cartridge 110 is preferably a hollow, tubular member that extends from the top portion 104 of the measuring tape housing 102 to the lower portion of the measure tape housing 102. The cartridge 110 is open at both ends so that a lever arm 108 and marking device can extend therethrough. The cartridge 110 is preferably arranged in a substantially vertical orientation. The lever arm 108 is connected to the top portion 104 of the measuring tape housing 102. The lever arm 108 extends through the cartridge 110 and is operationally connected to a marking device via a spring. The lever arm 110 is an elongated member having a first end permanently affixed to the top of the housing 102 and includes a second end perpendicularly connected to a marker that extends through the cartridge 110. The elongated member is flexible so that it can be moved between a first and second position in order to cause the marking device to extend from the housing 102.

The spring is housed in the lower portion of the cartridge 110. The lever arm 108 provides an active position and an inactive position via the spring. In the active position, the lever arm 108 is depressed and the marking device is extended downwardly by the pressure applied by the spring. In the inactive position, the spring is biased to a retracted position, wherein the marking device is housed within the cartridge 110. The spring is housed in the cartridge to secure and position and/or urge the marking device into engagement with a writing surface.

A marker 114 is removably secured within the cartridge 110. The marker 114 is operationally attached to the lever arm 108 via the spring 112. The marker 114 is movable separately and independently from the measuring tape by selectively depressing the lever arm 108 to lock the marker 114 in an extended position via the spring.

Figure 2:
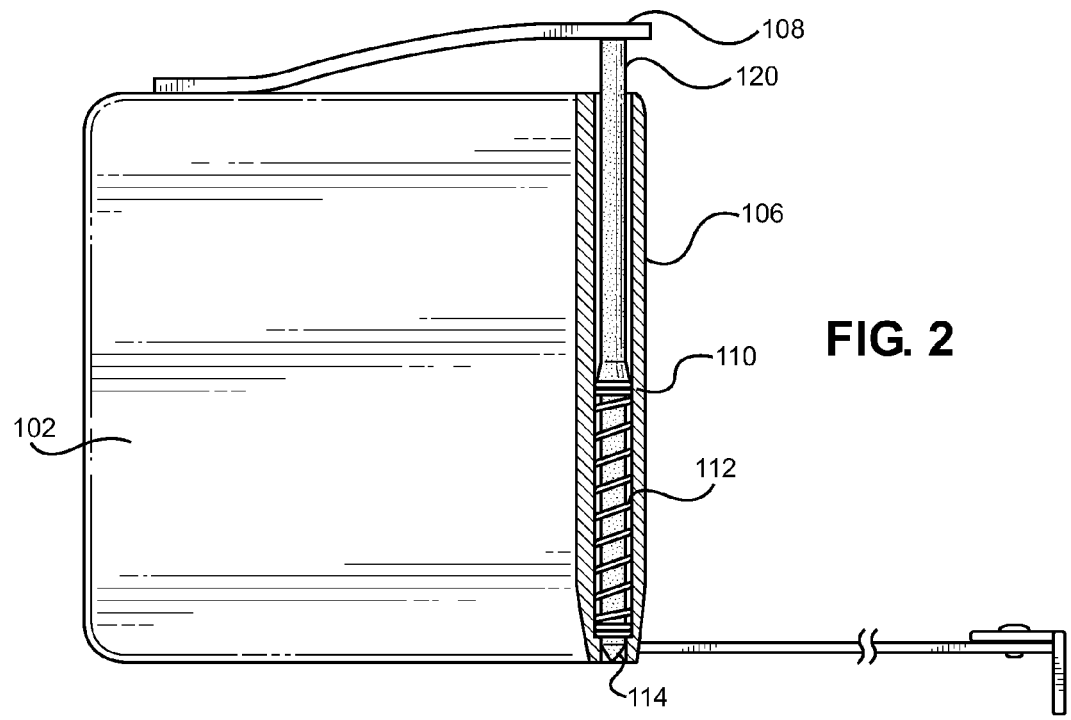
FIG. 2 shows a cross-sectional view of the combination tape measure and marking device in a retracted position according to one embodiment of the present invention.
Figure 3:
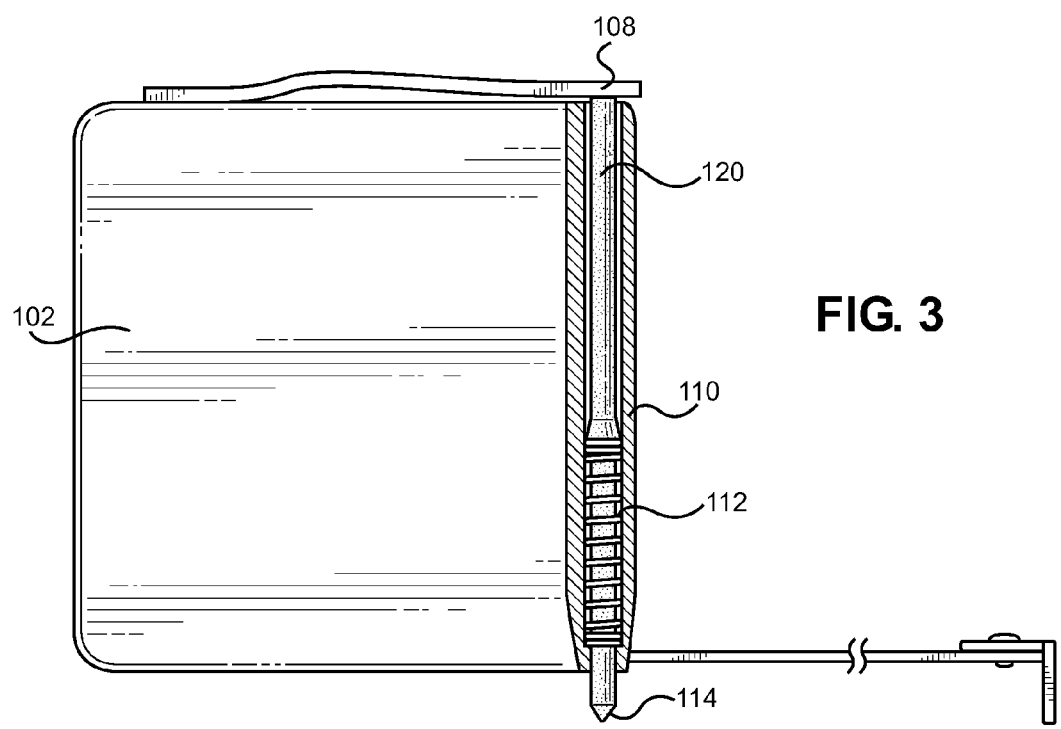
FIG. 3 shows a cross-sectional view of the combination tape measure and marking device in an extended position according to one embodiment of the present invention.

Referring now to FIGS. 2 and 3, there are shown cross-sectional views of the combination tape measure and marking device in a retracted position and an extended position, respectively. The housing 102 includes a front portion 106 with a cartridge 110 integrally attached thereto. The cartridge 110 may include a removable ink cartridge 120. The removable ink cartridge 120 supplies ink to the marker 114 located at a distal end of the removable ink cartridge 120. The marker 114 may include a felt tip pen. It is also contemplated that the marker 114 is an ink pen, lead pencil, colorant, or other ink dispensing apparatus.

The lever arm 108 is depressed to extend the marker 114 from the measuring tape housing 102. In an extended position, the felt tip pen aligns with a measurement line at the front portion 106 of the tape measure housing 106. The tip of the marker 114 is flush against a writing surface and the measuring tape housing 102 is moved to mark the surface. The marking indicates the measured length by the tape measurer. Additionally, the spring 112 is biased to a retracted position, wherein the felt tip pen 114 is contained within the cartridge 110.

In an alternate embodiment, the cartridge 110 may further include a ball and a cam shaft. The ball is constrained within the cam shaft. In a retracted position, the cam shaft is at its highest point and the ball is in the lowest point in the cam. When the lever arm 108 is depressed, the cam shaft moves downward and he ball moves up the cam shaft and rests in a groove of the cam shaft. The force from the spring 112 holds the ball in place within the cam shaft and keeps the removable ink cartridge 120 and marker 114 in an extended position.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tape measure in combination with a marker, comprising:
   a measuring tape housing including a top portion and a front portion;
   a lever arm connected to the top portion of the measuring tape housing;
   a cartridge integrally attached to the front portion of the measuring tape housing, wherein the lever arm extends through the cartridge;
   a spring housed in the cartridge;
   a marker removably secured within the cartridge, wherein the marker is operationally attached to the lever arm;
   wherein the lever arm comprises a first end attached to the top portion and a second end perpendicularly attached to the marker, the second end offset above the first end;
   wherein the marker is movable separately and independently from the measuring tape housing by selectively depressing the lever arm to lock the marker in an extended position via the spring.

2. The tape measure of claim 1, wherein the marker is spring biased to a retracted position within the cartridge.

3. The tape measure of claim 1, wherein the marker comprises a felt tip pen.

4. The tape measure of claim 1, wherein the marker aligns with a measurement line at the front portion of the tape measure housing when in the extended position.

5. The tape measure of claim 1, wherein the cartridge includes an ink cartridge.

6. The tape measure of claim 5, wherein the marker is located at a distal end of the removable ink cartridge.

7. The tape measure of claim 1, wherein the lever arm is adapted to be depressed to extend the marker to the extended position.

8. The tape measure of claim 1, wherein the spring is biased to a retracted position.

9. A tape measure in combination with a marker, comprising:
- a measuring tape housing including a top portion and a front portion;
- at least one lever arm connected to the top portion of the measuring tape housing, at least one cartridge integrally attached to the front portion of the measuring tape housing, wherein the lever arm extends through the cartridge;
- a spring housed in the cartridge;
- a marker removably secured within the cartridge, wherein the marker is operationally attached to the lever arm;
- wherein the lever arm comprises a first end attached to the top portion and a second end perpendicularly attached to the marker, the second end offset above the first end;
- wherein the marker is movable separately and independently from the measuring tape housing by selectively depressing the lever arm to lock the marker in an extended position via the spring.

10. The tape measure of claim 1, wherein the cartridge is offset from the measuring tape housing.

11. The tape measure of claim 1, wherein the cartridge is cylindrical.

12. The tape measure of claim 1, wherein the lever arm is flexible.

* * * * *